United States Patent
Ma et al.

(10) Patent No.: US 11,924,617 B2
(45) Date of Patent: Mar. 5, 2024

(54) METHOD FOR PROJECTING SCREEN, DISPLAY DEVICE, SCREEN PROJECTION TERMINAL, AND STORAGE MEDIUM

(71) Applicant: BOE TECHNOLOGY GROUP CO., LTD., Beijing (CN)

(72) Inventors: Mingyuan Ma, Beijing (CN); Youxiang Xia, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 173 days.

(21) Appl. No.: 17/331,703

(22) Filed: May 27, 2021

(65) Prior Publication Data

US 2022/0070599 A1     Mar. 3, 2022

(30) Foreign Application Priority Data

Aug. 25, 2020    (CN) .......................... 202010876013.0

(51) Int. Cl.
*H04R 29/00*      (2006.01)
*G06F 3/14*      (2006.01)
(Continued)

(52) U.S. Cl.
CPC ........... *H04R 29/002* (2013.01); *G06F 3/165* (2013.01); *H04N 9/3194* (2013.01);
(Continued)

(58) Field of Classification Search
CPC ... H04R 29/002; H04R 2499/15; G06F 3/165; G06F 3/1454; G06F 3/1431;
(Continued)

(56) References Cited

U.S. PATENT DOCUMENTS

| | | | |
|---|---|---|---|
| 2012/0192243 A1* | 7/2012 | Hall | H04N 21/43637 725/118 |
| 2013/0202123 A1* | 8/2013 | Nishizaki | H04R 25/70 381/60 |

(Continued)

FOREIGN PATENT DOCUMENTS

| | | |
|---|---|---|
| CN | 105700848 A | 6/2016 |
| CN | 106792055 A | 5/2017 |

(Continued)

OTHER PUBLICATIONS

First office action of Chinese application No. 202010876013.0 dated Dec. 15, 2021.

(Continued)

*Primary Examiner* — Carolyn R Edwards
*Assistant Examiner* — Kuassi A Ganmavo
(74) *Attorney, Agent, or Firm* — Lippes Mathias LLP

(57) ABSTRACT

A method for projecting a screen includes: receiving multimedia screen projection information of a plurality of screen projection terminals; displaying an image of multimedia projected by the plurality of screen projection terminals based on the multimedia screen projection information, and simultaneously playing an audio of the multimedia projected by at most one screen projection terminal; and feeding play state information of the audio of the multimedia projected by the screen projection terminal back to each of the screen projection terminals, such that the screen projection terminal enters a corresponding audio play mode.

18 Claims, 9 Drawing Sheets

(51) Int. Cl.
*G06F 3/16* (2006.01)
*H04L 67/148* (2022.01)
*H04N 9/31* (2006.01)
*H04N 21/41* (2011.01)
*H04N 21/431* (2011.01)
*H04N 21/436* (2011.01)

(52) U.S. Cl.
CPC .......... *G06F 3/1431* (2013.01); *G06F 3/1454* (2013.01); *H04L 67/148* (2013.01); *H04N 21/4126* (2013.01); *H04N 21/4312* (2013.01); *H04N 21/436* (2013.01); *H04R 2499/15* (2013.01)

(58) Field of Classification Search
CPC ............. H04N 9/3194; H04N 21/4312; H04N 21/436; H04N 21/485; H04N 21/4126; H04N 21/43615; H04L 67/148
See application file for complete search history.

(56) References Cited

U.S. PATENT DOCUMENTS

| | | | | |
|---|---|---|---|---|
| 2014/0240440 A1* | 8/2014 | Seo | ........................ | H04L 51/04 715/753 |
| 2015/0082355 A1* | 3/2015 | Tiddens | ........... | H04N 21/43637 725/48 |
| 2015/0208354 A1* | 7/2015 | Lokhande | ......... | H04W 52/0258 455/574 |
| 2015/0319485 A1* | 11/2015 | Vedula | ............... | H04N 21/2665 725/74 |
| 2016/0170709 A1 | 6/2016 | Jang et al. | | |
| 2017/0223096 A1* | 8/2017 | Krishnakumar | .... | G06F 3/04817 |
| 2017/0230453 A1* | 8/2017 | Verma | .................... | H04N 21/40 |
| 2019/0212848 A1 | 7/2019 | Lee et al. | | |
| 2020/0183525 A1* | 6/2020 | Liu | ........................ | G06F 3/0416 |
| 2021/0042132 A1* | 2/2021 | Park | ........................ | G06F 9/452 |
| 2022/0308823 A1* | 9/2022 | Fan | ........................ | G06F 3/0481 |

FOREIGN PATENT DOCUMENTS

| | | | | |
|---|---|---|---|---|
| CN | 109032555 A | | 12/2018 | |
| CN | 110248224 A | | 9/2019 | |
| CN | 110381197 A | * | 10/2019 | ........... G06F 3/1431 |
| CN | 110381197 A | | 10/2019 | |
| CN | 111031368 A | * | 4/2020 | ......... H04N 21/4122 |
| CN | 111031368 A | | 4/2020 | |
| CN | 111131866 A | | 5/2020 | |
| WO | 2020103326 A1 | | 5/2020 | |
| WO | WO-2021103846 A1 | * | 6/2021 | ......... H04N 21/4122 |

OTHER PUBLICATIONS

China National Intellectual Property Administration, Second office action of Chinese application No. 202010876013.0 dated May 18, 2022, which is foreign counterpart application of this US application.

* cited by examiner

METHOD FOR PROJECTING SCREEN, DISPLAY DEVICE, SCREEN PROJECTION TERMINAL, AND STORAGE MEDIUM

This application is based on and claims priority to Chinese Patent Application No. 202010876013.0, filed on Aug. 25, 2020 and entitled "METHOD AND APPARATUS FOR PROJECTING SCREEN, DEVICE AND STORAGE MEDIUM," the disclosure of which of which is incorporated herein by reference in its entirety.

TECHNICAL FIELD

The present disclosure relates to the field of video screen projection technologies. Specifically, the present disclosure relates to a method and an apparatus for projecting a screen, a device, and a storage medium.

BACKGROUND

Nowadays, users are imposing more and more diversified requirements on the screen projection function of screen projection terminals (for example, mobile phones). In some application scenarios, the screen projection terminals of multiple users usually project the screen to the same display device (for example, a television) simultaneously.

SUMMARY

Embodiments of the present disclosure provide a method and an apparatus for projecting a screen, a device, and a storage medium.

In a first aspect, the embodiments of the present disclosure provide a method for projecting a screen, which is applicable to a display device. The method includes: receiving multimedia screen projection information of a plurality of screen projection terminals; displaying images of multimedia projected by the plurality of screen projection terminals based on the multimedia screen projection information, and playing an audio of the multimedia projected by at most one of the plurality of screen projection terminals while displaying the image; and feeding play state information of the audio of the projected multimedia back to the plurality of screen projection terminals, wherein the screen projection terminal enters a corresponding audio play mode in response to receiving the play state information.

In some embodiments, playing the audio of the multimedia includes: playing the audio of the multimedia projected by the screen projection terminal corresponding to a first received audio play request; or entering a silent mode.

In some embodiments, the play state information includes at least one of multimedia-played information and multimedia-unplayed information, wherein the screen projection terminal corresponding to the audio that has been played by the display device enters a first audio play mode in response to receiving the multimedia-played information, and the screen projection terminal corresponding to the audio that has not been played by the display device enters a second audio play mode in response to receiving the multimedia-unplayed information. The first audio play mode is a mode in which the audio of the multimedia projected by the screen projection terminal is played by the display device; and the second audio play mode is a mode in which the audio of the multimedia projected by the screen projection terminal is played by the screen projection terminal.

In the embodiments of the present disclosure, the screen projection terminal in the first audio play mode in the plurality of screen projection terminals is used as a first screen projection terminal, and the screen projection terminal in the second audio play mode in the plurality of screen projection terminals is used as a second screen projection terminal.

In some embodiments, the method further includes: receiving first feedback information from the first screen projection terminal for an audio switch request of the second screen projection terminal; wherein the first feedback information indicates approval of switching; and in response to receiving the first feedback information, switching the currently played audio to the audio of the multimedia projected by the second screen projection terminal, and controlling the second screen projection terminal to be switched to the first audio play mode.

In some embodiments, the method further includes: stopping playing the audio of the multimedia projected by the first screen projection terminal in response to receiving exit information from the first screen projection terminal; and playing the audio of the multimedia projected by the second screen projection terminal in response to receiving an audio play instruction from the second screen projection terminal by the display in a non-audio play state.

In some embodiments, the method further includes: sending multimedia indication information of the multimedia projected by each of the screen projection terminals to at least one of the plurality of screen projection terminals, wherein the multimedia indication information includes image indication information and audio indication information; receiving selection information from the at least one screen projection terminal, wherein the selection information is sent by the corresponding screen projection terminal for the select operation of a displayed image list and a displayed audio list, the image list and the audio list are acquired based on the multimedia indication information, the selection information indicates target information, the target information including at least one of image information and audio information of target multimedia; and in response to receiving the selection information, sending the target information to the corresponding screen projection terminal.

In some embodiments, the method further includes: displaying a screen projection terminal list, and the image list and the audio list of the multimedia projected by each of the screen projection terminals; determining a target screen projection terminal in response to a select operation for the screen projection terminal list; determining the target information in response to a select operation for the image list and the audio list, wherein the target information includes at least one of the image information and the audio information of the target multimedia; and sending the target information to the target screen projection terminal.

In some embodiments, the multimedia is a video.

In a second aspect, the embodiments of the present disclosure provide a display device. The display device includes: a memory storing a computer program; and a processor communicably connected to the memory; wherein the processor, when running the computer program, is caused to perform the method for projecting a screen according to the first aspect of the embodiments of the present disclosure.

In a third aspect, the embodiments of the present disclosure provide a method for projecting a screen, which is applicable to a display device. The method includes: sending multimedia screen projection information to a display device; and in response to receiving play state information of an audio of multimedia projected by the screen projection terminal from the display device, entering an audio play mode corresponding to the play state information.

In some embodiments, entering the audio play mode corresponding to the play state information includes: entering a first audio play mode in response to receiving multimedia-played information of the audio of the multimedia projected by the screen projection terminal from the display device, wherein the first audio play mode is a mode in which the audio of the multimedia projected by the screen projection terminal is played by the display device; and entering a second audio play mode in response to receiving multimedia-unplayed information of the audio of the multimedia projected by the screen projection terminal from the display device, wherein the second audio play mode is a mode in which the audio of the multimedia projected by the screen projection terminal is played by the screen projection terminal.

In some embodiments, the screen projection terminal is a first screen projection terminal, the first screen projection terminal being a screen projection terminal currently active in a first audio play mode; and the method further includes: receiving an audio switch request from a second screen projection terminal, wherein the second screen projection terminal is a screen projection terminal currently active in a second audio play mode; sending first feedback information for the audio switch request to the display device and the second screen projection terminal, wherein the first feedback information indicates approval of switching; and switching the current first audio play mode of the first screen projection terminal to the second audio play mode.

In some other embodiments, the screen projection terminal is a first screen projection terminal, the first screen projection terminal being a screen projection terminal currently active in the first audio play mode; and the method further includes: sending exit information to the display device and a second screen projection terminal respectively in response to receiving a play stop instruction, such that the display device stops playing the audio of the multimedia projected by the first screen projection terminal, and the second screen projection terminal sends an audio play instruction to the display device in response to receiving a switch instruction; and the second screen projection terminal is a screen projection terminal currently active in the second audio play mode.

In some other embodiments, the screen projection terminal is a first screen projection terminal, the first screen projection terminal being a screen projection terminal currently active in the first audio play mode; and the method further includes: sending the audio switch request to the first screen projection terminal in response to receiving the switch instruction, wherein the second screen projection terminal is a screen projection terminal currently active in the second audio play mode; receiving the first feedback information from the first screen projection terminal for the audio switch request, wherein the first feedback information indicates approval of switching; and switching the current second audio play mode of the second screen projection terminal to the first audio play mode in response to the first feedback information.

In some embodiments, the method further includes: upon receipt of the exit information from the first screen projection terminal, sending the audio play instruction to the display device in response to receiving the switch instruction, wherein the audio play instruction is configured to instruct the display device to play the audio of the multimedia projected by the second screen projection terminal.

In some embodiments, the method further includes: displaying an image list and an audio list based on multimedia indication information of the multimedia projected by each of the screen projection terminals received from the display device, wherein the multimedia indication information includes image indication information and audio indication information; sending selection information to the display device in response to a select operation for the image list and the audio list, wherein the selection information indicates target information, and the target information includes at least one of image information and audio information of target multimedia; and displaying at least one of a corresponding image and a corresponding audio in response to receiving the target information from the display device.

In some embodiments, the method further includes: receiving the target information from the display device for the screen projection terminal, wherein the target information includes at least one of the image information and the audio information of the target multimedia; and playing at least one of the corresponding image and the corresponding audio of the target information; wherein the image information of the target multimedia is the image information determined by the display device in response to the select operation for the image list of the multimedia projected by each of the screen projection terminals; and the audio information of the target multimedia is the audio information determined by the display device in response to the select operation for the audio list of the multimedia projected by each of the screen projection terminals.

In a fourth aspect, the embodiments of the present disclosure provide a screen projection terminal. The screen projection terminal includes: a memory storing a computer program; and a processor communicably connected to the memory; wherein the processor, when running a computer program, is caused to perform the processor to implement the method for projecting a screen according to the fourth aspect of the embodiments of the present disclosure.

In a fifth aspect, the embodiments of the present disclosure provide a non-transitory computer-readable storage medium storing a computer program. The computer program, when run by a processor, causes the processor to perform the method for projecting a screen according to the first aspect or fourth aspect of the embodiments of the present disclosure.

DETAILED DESCRIPTION

Descriptions are made in detail to the present disclosure, and the examples of the embodiments of the present disclosure are illustrated in the accompanying drawings. The reference numbers which are the same or similar throughout the accompanying drawings represent the same or similar components or components with the same or similar functions. In addition, detailed description of the prior art unnecessary for the illustrated features of the present disclosure is not given. The embodiments described below with reference to the accompanying drawings are illustrative, and are merely configured to explain the present disclosure without being construed as limitations to the present disclosure.

When a plurality of screen projection terminals simultaneously deliver multimedia to a display device, if the multimedia delivered by the plurality of screen projection terminals all includes images and audios, then the display device simultaneously plays the received images and sounds of the multiple multimedia. The sounds of these multimedia are superimposed on each other, resulting in greater sound chaos, which affects normal viewing of users.

To this end, the embodiments of the present disclosure provide a method for projecting a screen. At most one audio of a plurality of received multimedia is played by the display device to avoid sound superimposition. In the embodiments of the present disclosure, the multimedia refers to multimedia including both the image and audio, including but not limited to a video, power point (PPT) with sounds, or the like.

The embodiments of the present disclosure are described below by using a video as an example of the multimedia.

Figure 1:
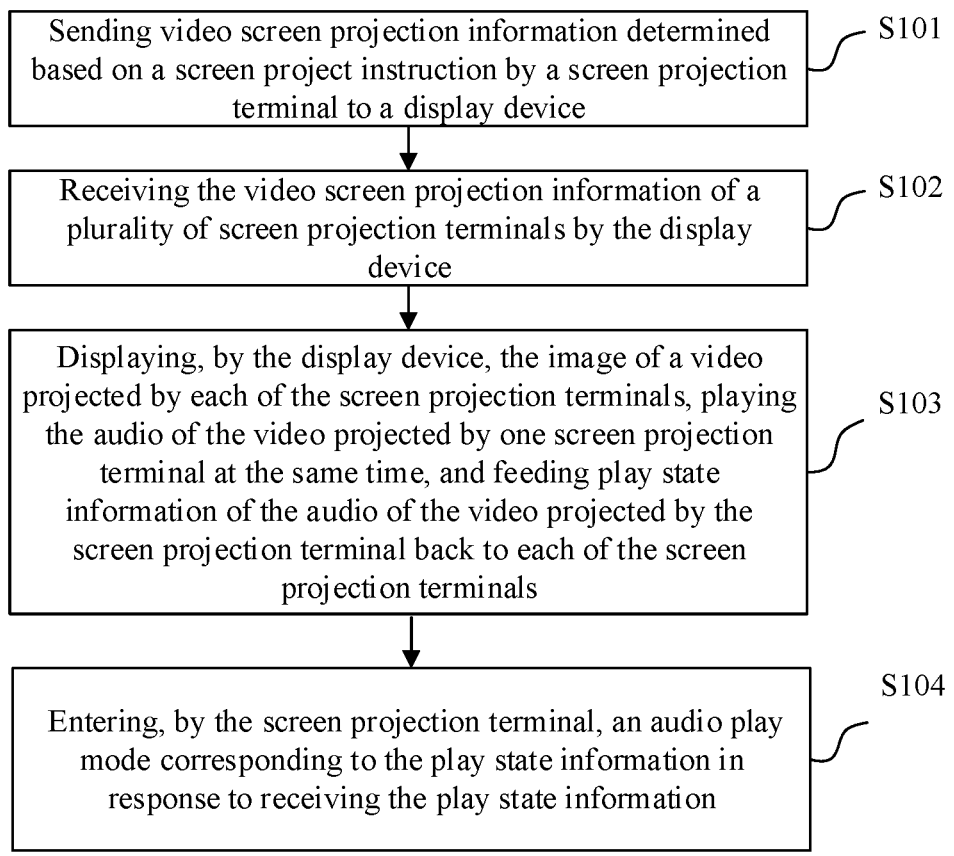
FIG. 1 is a schematic flowchart of a method for projecting a screen according to an embodiment of the present disclosure.

An embodiment of the present disclosure provides a method for projecting a screen, which is applicable to the display device and each of the screen projection terminals projecting a screen on the display device. As shown in FIG. 1, the method includes the following processes.

In S101, the screen projection terminal sends video screen projection information to the display device.

The video screen projection information is determined by the screen projection terminal based on a screen project instruction. In the embodiments of the present disclosure, the screen project instruction may be generated in response to a user operation. Exemplarily, the user operation may be a touch operation on a screen projection option, for example, a click operation.

The video screen projection information in the embodiments of the present disclosure may include: video information (including image information and audio information, wherein image display and/or audio play may be performed based on the video information when in need) and a screen project request (configured to request to project the screen of the screen projection terminal on the display device).

In some embodiments, in addition to the video information and the screen project request, the video screen projection information in the embodiments of the present disclosure may also include an audio play request. The audio play request may be configured to request the display device to play the audio of the video projected by the screen projection terminal.

Each of the screen projection terminals in the embodiments of the present disclosure may be a mobile terminal, for example, any one of the following types of mobile terminals: a mobile phone, a laptop, a tablet computer, a smart bracelet, a smart watch, or the like. The types of the plurality of screen projection terminals projecting the screen to the same display device may be the same or different.

The display device in the embodiments of the present disclosure may be any one or a combination of multiple types of display devices, such as a cathode ray tube (CRT) display, a liquid crystal display (LCD), and a light-emitting diode (LED) display.

In S102, the display device receives the video screen projection information of the plurality of screen projection terminals.

In S103, the display device displays the image of the video projected by each of the screen projection terminals, plays the audio of the video projected by one screen projection terminal at the same time, feeds play state information of the audio of the video projected by the screen projection terminal back to each of the screen projection terminals, and then performs S104 or S105.

In the embodiments of the present disclosure, the play state information includes multimedia-played information or multimedia-unplayed information. The multimedia-played information indicates that the audio of the video projected by the screen projection terminal has been played by the display device. The multimedia-unplayed information indicates that the audio of the video projected by the screen projection terminal has not been played by the display device yet.

In an optional embodiment, in the plurality of screen projection terminals that send the video screen projection information, if the video screen projection information from only one screen projection terminal carries the audio play request, the display device only plays the audio of the video projected by such one screen projection terminal. If the video screen projection information from the plurality of screen projection terminals all carries the audio play request, the audio of the video projected by the screen projection terminal that sends the audio play request at the earliest is played by default, or the audio of the video projected by the screen projection terminal to which the audio play request received at the earliest belongs is played.

In another optional embodiment, if only one screen projection terminal sends the video screen projection information to the display device at the same time, the display device plays the audio of the video projected by such screen projection terminal by default whether such video screen projection information carries the audio play request or not.

In an optional embodiment, the display device simultaneously displays the images of videos projected by the plurality of screen projection terminals in the form of split screens. Here, by screen splitting, the image of the video projected by each of the screen projection terminals occupies part of the region of a screen of the display device, and the areas corresponding to all images are not overlapped.

In S104, the screen projection terminal enters an audio play mode corresponding to the play state information in response to receiving the play state information.

In some embodiments, in S104, the screen projection terminal enters a first audio play mode in response to receiving the multimedia-played information.

In the embodiments of the present disclosure, the screen projection terminal that enters the first audio play mode is referred to as a first screen projection terminal. At the same time, only one first screen projection terminal is present in the plurality of screen projection terminals that project the screen on the display device.

The first audio play mode in the embodiments of the present disclosure is a mode in which the audio of the video projected by the screen projection terminal is played through the display device. For example, the audio of the video projected by the screen projection terminal is publicly played through the display device or played through an external play device of the display device. In the first audio play mode, the first screen projection terminal does not play the corresponding audio.

In other embodiments, in S104, the screen projection terminal enters a second audio play mode in response to receiving the multimedia-unplayed information.

In the embodiments of the present disclosure, the screen projection terminal that enters the second audio play mode is referred to as a second screen projection terminal. At the same time, there may be one or more second screen projection terminals in the plurality of screen projection terminals that project the screen on the display device.

The second audio play mode in the embodiments of the present disclosure is a mode in which the audio of the video projected by the screen projection terminal is played by the screen projection terminal. For example, the audio of the video projected by the screen projection terminal is publicly played in a public play mode of the screen projection terminal, or the audio of the video projected by the screen projection terminal is played in an earphone mode of the screen projection terminal. At this time, the display device may publicly play the audio of the video projected by the first screen projection terminal.

It should be noted that in S103, the display device plays the audio of the video projected by one screen projection terminal. In other embodiments, S103 may be replaced with: the display device enters a silent mode (that is, the display device does not publicly play any sound). In this case, the play state information fed by the display device back to all screen projection terminals is multimedia-unplayed information. Accordingly, all screen projection terminals are second screen projection terminals.

In some embodiments, in the case that the display device enters the silent mode, none of the video screen projection information received by the display device carries the audio play request, or all the video projection information sent by the plurality of screen projection terminals and received by the display device carries the audio play request.

Through the above solution of the embodiment of the present disclosure, the display device can simultaneously display the images of multiple videos while receiving the videos projected by the plurality of screen projection terminals. In this way, the user can freely view each image through the display device, thereby realizing image sharing on the display device side. Meanwhile, the display device only plays the audio of at most one of the received plurality of videos, so as to avoid sound conflicts caused by audio superposition when the audios of the plurality of videos are played at the same time, thereby reducing the auditory interference of the users.

In addition, the display terminal feeds the play state information back to the screen projection terminal, such that the screen projection terminal can enter the corresponding audio play mode based on a play situation of the display device, the users can listen to respective audios in different ways and user experience is improved.

Figure 2:
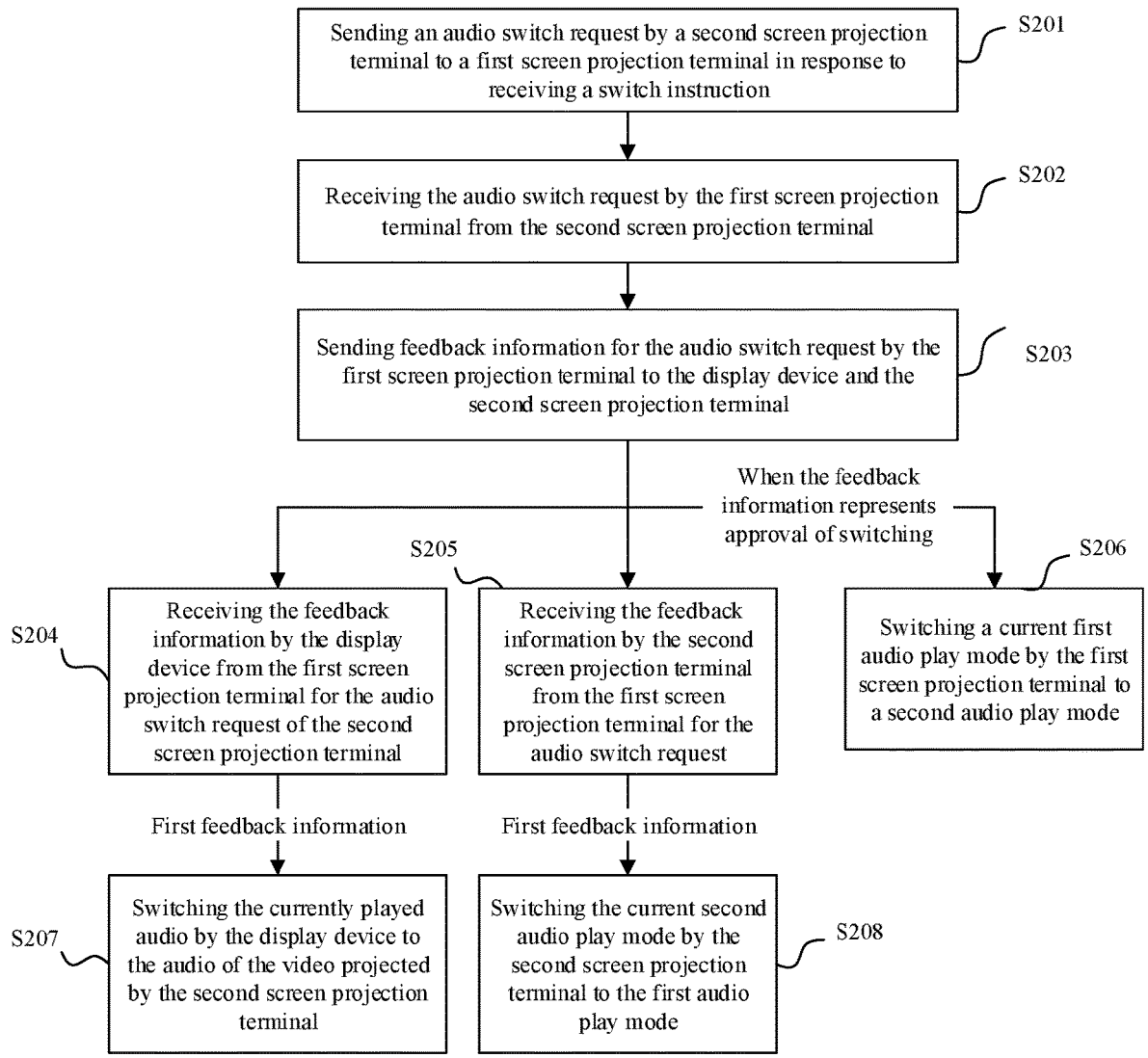
FIG. 2 is a schematic partial flowchart of another method for projecting a screen according to an embodiment of the present disclosure.

In an optional embodiment, as shown in FIG. 2, the method for projecting a screen according to the embodiment of the present disclosure may further include the following processes.

In S201, the second screen projection terminal sends an audio switch request to the first screen projection terminal in response to receiving a switch instruction.

The switch instruction may be generated in response to the operation of the user for the second screen projection terminal. For example, the user performs the operation of audio switching on the second screen projection terminal.

In some embodiments, the second screen projection terminal may directly send the audio switch request to the first screen projection terminal, or may also send the audio switch request to the display device, and the audio switch request is forwarded to the first screen projection terminal through the display device.

In S202, the first screen projection terminal receives the audio switch request from the second screen projection terminal.

In some embodiments, the first screen projection terminal may directly receive the audio switch request from the second screen projection terminal, or may also receive the audio switch request forwarded by the display device.

In S203, the first screen projection terminal sends feedback information for the audio switch request to the display device and the second screen projection terminal.

If the feedback information is first feedback information indicating approval of switching, the first screen projection terminal performs S206. If the feedback information is second feedback information indicating disapproval of switching, the first screen projection terminal maintains the current state. It should be noted that the process when the feedback information is the second feedback information is not shown in FIG. 2.

It should be noted that, in other embodiments, the first screen projection terminal may perform S206 before sending the first feedback information.

In some embodiments, the first screen projection terminal may directly send the feedback information to the second screen projection terminal, or the feedback information may be forwarded to the second screen projection terminal through the display device.

In S204, the display device receives the feedback information from the first screen projection terminal for the audio switch request of the second screen projection terminal, and the display device performs S207 in response to the feedback information being the first feedback information, and maintains the current state in response to the feedback information being the second feedback information.

In S205, the second screen projection terminal receives the feedback information requested to be returned by the first screen projection terminal for the audio switch request.

The second screen projection terminal performs S208 in response to the feedback information being the first feedback information, and maintains the current state.in response to the feedback information being the second feedback information.

In S206, the first screen projection terminal switches the current first audio play mode to the second audio play mode.

By S206, the first screen projection terminal switches the play mode through the display device to the play mode through itself.

In S207, the display device switches the currently played audio to the audio of the video projected by the second screen projection terminal.

In S208, the second screen projection terminal switches the current second audio play mode to the first audio play mode.

By S208, the second screen projection terminal switches the play mode by itself to the play mode through the display device.

The embodiment of the present disclosure can switch an audio play source of the display device, for example, switch from playing the audio of the video projected by the first screen projection terminal to playing the audio of the video projected by the second screen projection terminal, so as to satisfy listening needs of different users and improve the user experience.

Each of the screen projection terminals in the embodiments of the present disclosure can be switched between the first screen projection terminal and the second screen projection terminal. For the same screen projection terminal, when the screen projection terminal is in the first audio play mode, the screen projection terminal is the first screen projection terminal, and processes S202, S203, and S206 and optional sub-processes thereof can be performed. When the screen projection terminal is finally in the second audio play mode, the screen projection terminal is the second screen projection terminal, and processes S201, S205, and S208 and optional sub-processes thereof can be performed.

Figure 3:
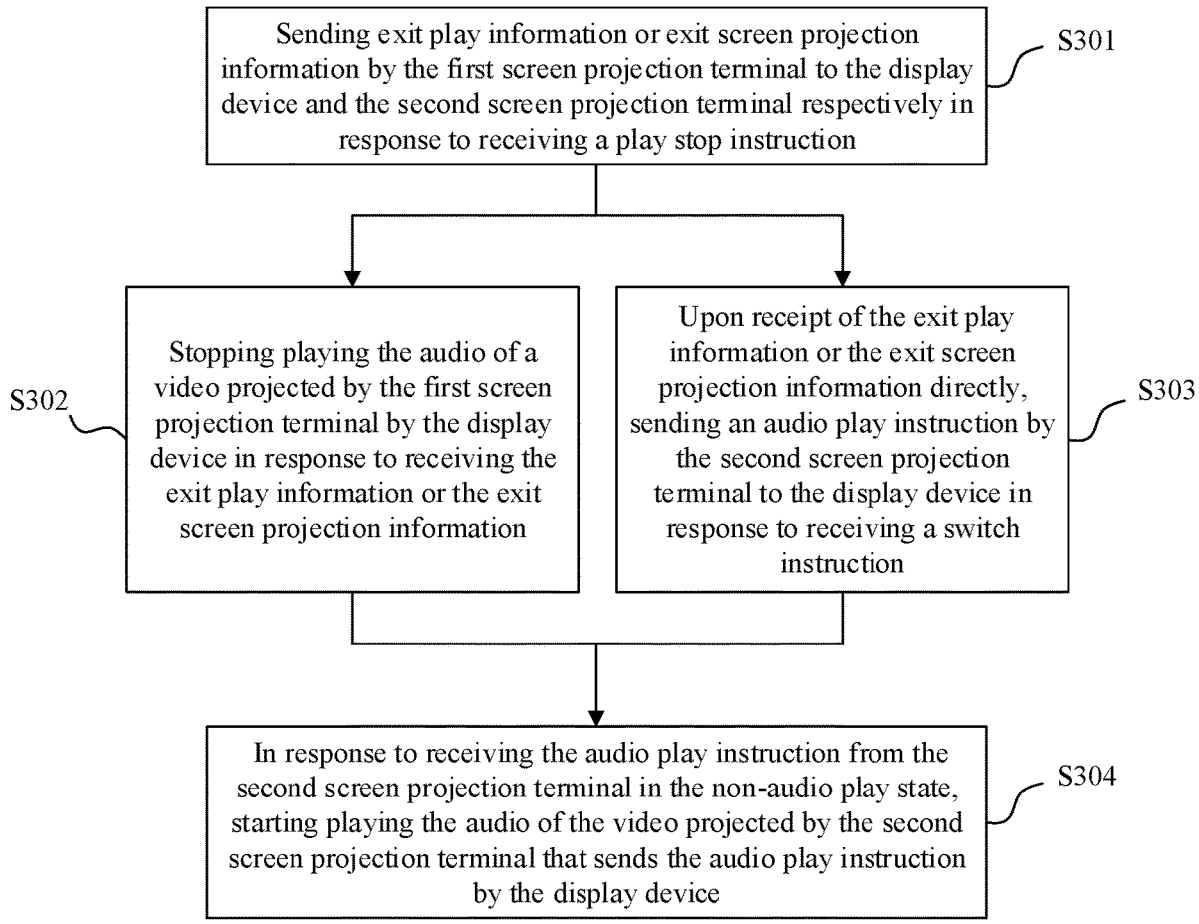
FIG. 3 is a schematic partial flowchart of yet another method for projecting a screen according to an embodiment of the present disclosure.

In an optional embodiment, as shown in FIG. 3, the method for projecting a screen according to the embodiment of the present disclosure may further include the following processes.

In S301, the first screen projection terminal sends exit information to the display device and the second screen projection terminal respectively in response to receiving a play stop instruction.

The exit information sent to the display device is configured to indicate the display device to stop playing the audio of the video projected by the first screen projection terminal. The exit information sent to the second screen projection terminal is configured to notify the second screen projection terminal that the audio of the projected video can be played through the display device.

In some embodiments, the exit information is exit play information or exit screen projection information.

In some embodiments, the play stop instruction is generated in response to the operation of the user for the first screen projection terminal. For example, the user touches a touch key of stopping the first audio play mode on the first screen projection terminal or a touch key of stopping projecting the screen on the display device on the first screen projection terminal. In other examples, the play stop instruction is automatically generated based on a preset program. For example, after the playing or screen projection lasts for a specified period of time, the play stop instruction is automatically generated to indicate to exit the first audio play mode or exit the screen projection.

In some embodiments, the first screen projection terminal may directly send the exit information to the second screen projection terminal, or after the exit information is sent to the display device, the exit information may be forwarded to the second screen projection terminal through the display device.

In S302, the display device stops playing the audio of the video projected by the first screen projection terminal in response to receiving the exit information from the first screen projection terminal, and then performs S304.

When the exit information received by the display device is the exit screen projection information, the display device stops displaying the image of the video projected by the first screen projection terminal while stopping playing the audio of the video projected by the first screen projection terminal. That is, the display of the entire video content projected by the first screen projection terminal is stopped at this time.

When the exit information received by the display device is the exit play information, the display device stops playing the audio of the video projected by the first screen projection terminal, but continues to display the image of the video projected by the first screen projection terminal.

In response to stopping playing the audio of the video projected by the first screen projection terminal, the display device enters a non-audio play state.

In S303, upon receipt of the exit information, the second screen projection terminal sends an audio play instruction to the display device in response to receiving a switch instruction.

Specifically, processes S302 and S303 are subject to no strict sequence, and may be performed simultaneously or sequentially.

In some embodiments, when receiving the exit information, the second screen projection terminal may automatically generate an option to prompt the user whether to switch the play mode. When the user chooses to switch the play mode, the second screen projection terminal receives the switch instruction. In response to receiving the switch instruction, the second screen projection terminal sends the audio play instruction to the display device. The audio play instruction is configured to instruct the display device to switch the played audio.

In S304, in response to receiving an audio play instruction from the second screen projection terminal in the non-audio play state, the display device starts playing the audio of the video projected by the second screen projection terminal that sends the audio play instruction.

The non-audio play state in the embodiments of the present disclosure indicates a state in which no audio is currently played.

In an optional embodiment, in response to receiving the audio play instruction from the plurality of second screen projection terminals in the non-audio play state, the display device starts playing the audio of the video projected by the second screen projection terminal that sends the first audio play instruction in response to receiving the first audio play instruction.

In some embodiments, after the display device starts playing the audio of the video projected by the second screen projection terminal based on the audio play instruction, the switching of the played audio is completed. That is, the audio of the video projected by the first screen projection terminal is switched to the audio of the video projected by the second screen projection terminal. After the display device completes the audio switching, the audio play mode of the second screen projection terminal is switched accordingly by sending the play state information to the second screen projection terminal. For example, the second audio play mode in which the audio is played by the screen projection terminal is switched to the first audio play mode in which the audio is played by the display device.

According to the embodiments of the present disclosure, the audio play source of the display device is switched when the first screen projection terminal actively exits the first audio play mode or actively exits the screen projection, for example, switched from playing the audio of the video projected by the first screen projection terminal to the audio of the video projected by the second screen projection terminal, so as to satisfy the listening needs of different users and improve the user experience.

Figure 4:
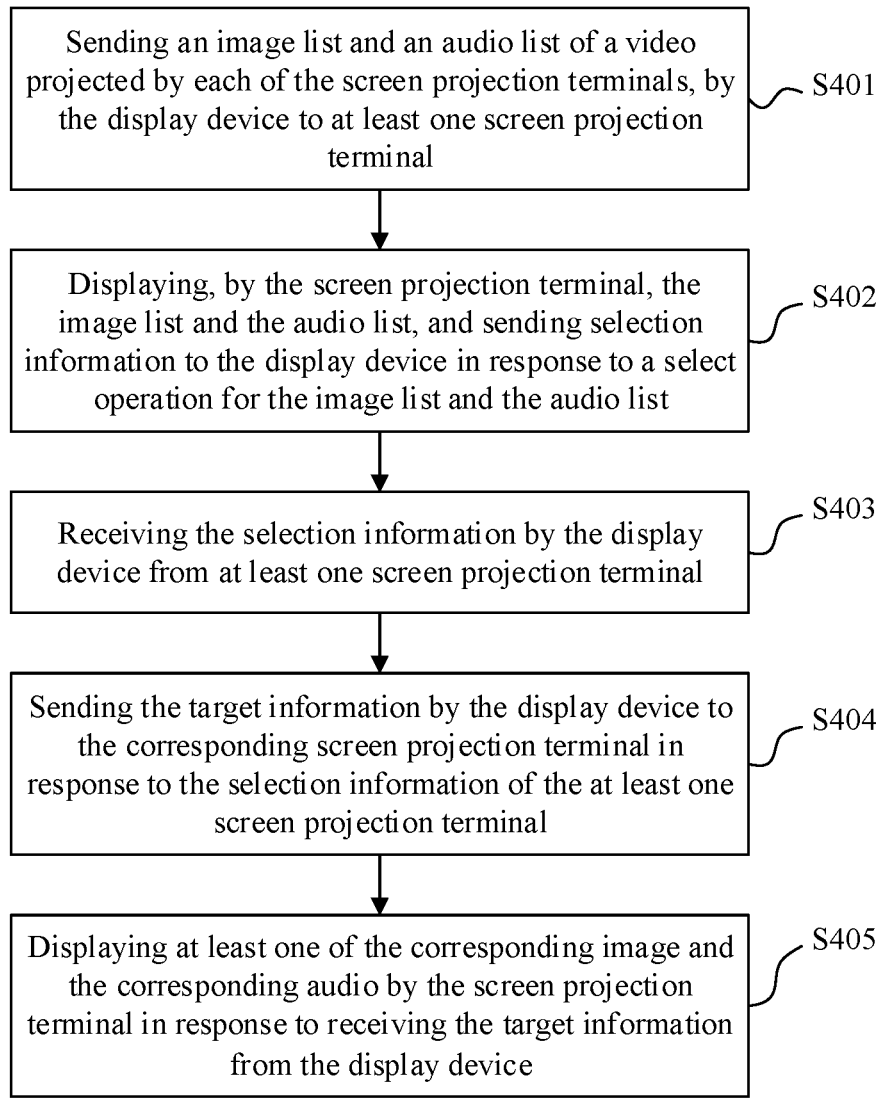
FIG. 4 is a schematic partial flowchart of still a further method for projecting a screen according to an embodiment of the present disclosure.

In an optional embodiment, as shown in FIG. 4, the method for projecting a screen according to the embodiment of the present disclosure may further include the following processes.

In S401, the display device sends video indication information of the video projected by each of the screen projection terminals to at least one screen projection terminal.

The video indication information includes image indication information and audio indication information. For the selected plurality of screen projection terminals, the display device may send the video indication information of the video projected by each of the screen projection terminals to each of the screen projection terminals. Here, the selected plurality of screen projection terminals are part or all of the plurality of screen projection terminals that project the screen on the display device.

The image indication information in the embodiments of the present disclosure may include brief information of the image of the video projected by each of the screen projection terminals. The audio indication information may include the brief information of the audio of the video projected by each of the screen projection terminals to facilitate the selection of the user.

In S402, the screen projection terminal displays an image list and an audio list which correspond to the video indication information after receiving the video indication information of the video projected by each of the screen projection terminals from the display device, and sends selection information to the display device in response to a select operation for the image list and the audio list.

Figure 5:
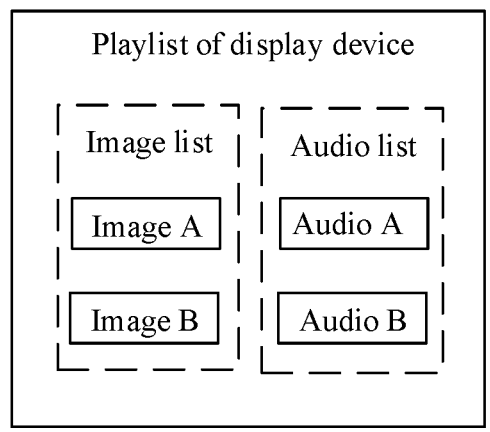
FIG. 5 is a schematic diagram of a display effect of displaying a video list on a screen projection terminal according to an embodiment of the present disclosure.

In some embodiments, each of the screen projection terminals that receives the video indication information may display the corresponding image list and the corresponding audio list to the user, and the display effect is as shown in FIG. 5. The display device playlist in FIG. 5 is a list of the videos projected by respective screen projection terminals, which includes the image list and the audio list. The image A and the image B in the image list are the image of the video projected by the screen projection terminal A and the image of the video projected by the screen projection terminal B respectively. The audio A and the audio B in the audio list are the audio of the video projected by the screen projection terminal A and the audio of the video projected by the screen projection terminal B respectively. The screen projection terminal A may be the first screen projection terminal or the second screen projection terminal based on the audio play mode in which the screen projection terminal A is currently active. The same is true for the screen projection terminal B.

The select operation for the image list and the audio list may be the click operation or touch operation of the user for a certain image option in the image list and a certain audio option in the audio list which are displayed on the screen projection terminal as shown in FIG. 5.

The selection information indicates target information. The target information includes at least one of image information and audio information of a target video.

In S403, the display device receives the selection information from at least one screen projection terminal.

For the selected the plurality of screen projection terminals, the display device may receive the selection information from each of the screen projection terminals.

In S404, the display device sends the target information to the corresponding screen projection terminal in response to receiving the selection information of at least one screen projection terminal.

In the embodiments, the image information of the target video is the image information of one video determined by the display device based on the selection information sent by the screen projection terminal. The audio information of the target video is the audio information of one video determined by the display device based on the selection information sent by the screen projection terminal.

In S405, in response to receiving the target information from the display device, the screen projection terminal displays at least one of a corresponding image and a corresponding audio.

Figure 6:
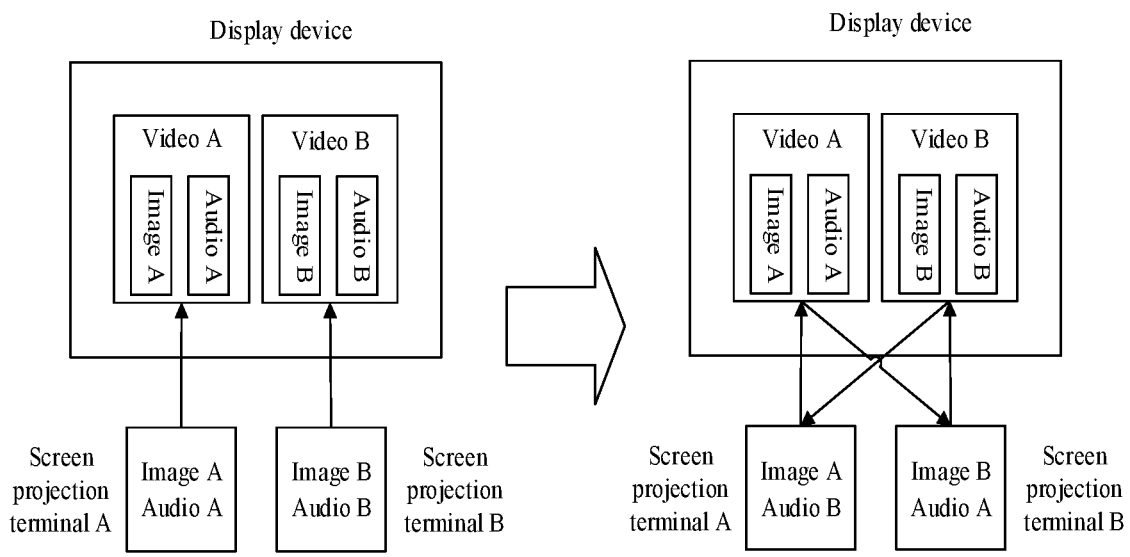
FIG. 6 is a schematic diagram of a switching mode for content displayed on a screen projection terminal in an embodiment of the present disclosure.

In the embodiment shown in FIG. 5, if the selection information sent by the screen projection terminal A is information for selecting the audio B, then the target audio information determined by the display device is the audio information of the audio B. The display device sends the audio information of the audio B to the screen projection terminal A, and the screen projection terminal A may play the audio B through the second audio play mode. At this time, the screen projection terminal A is switched from the display mode in which the audio A is played while the image A is displayed as shown on the left side of FIG. 6 to the display mode in which the audio B is played while the image A is displayed as shown on the right side of FIG. 6. The same is true for the screen projection terminal B in FIG. 6.

Figure 7:
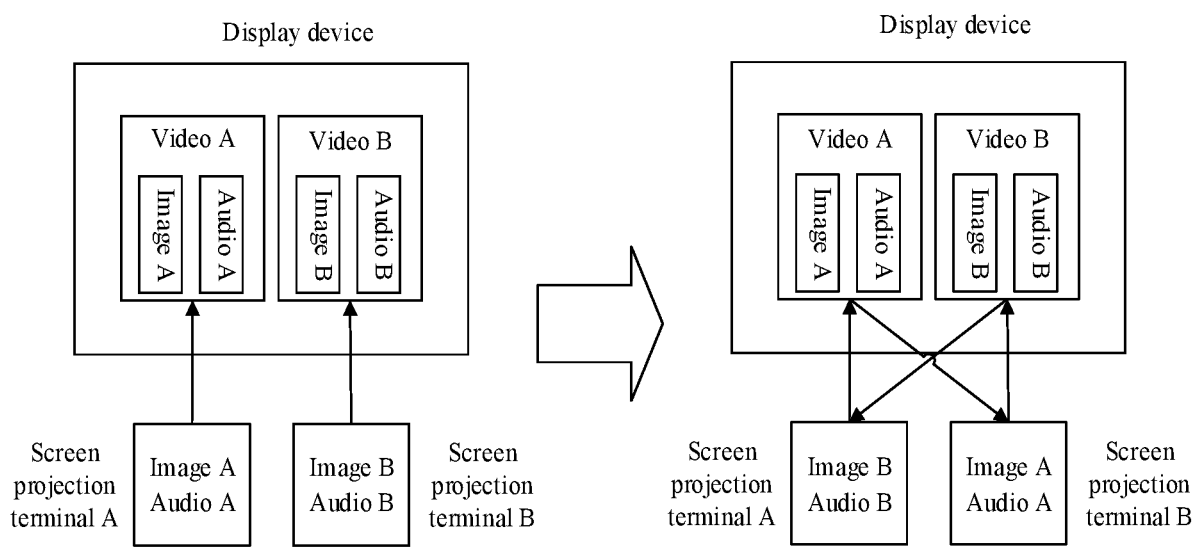
FIG. 7 is a schematic diagram of another switching mode for the content displayed on the screen projection terminal according to an embodiment of the present disclosure.

In the embodiment shown in FIG. 5, if the selection information sent by the screen projection terminal A is information for simultaneously selecting the image B and the audio B, the target image information determined by the display device is the image information of the image B, and the determined target audio information is the audio information of the audio B. The display device sends the image information of the image B and the audio information of the audio B to the screen projection terminal A. The screen projection terminal A may play the audio B in the second audio play mode while displaying the image B. At this time, the screen projection terminal A is switched from the display mode in which the audio A is played while the image A is displayed as shown on the left side of FIG. 7 to the display mode in which the audio B is played while the image B is displayed as shown on the right side of FIG. 7. The same is true for the screen projection terminal B in FIG. 7.

In this way, the selection for the image and audio of each video can be completed on the screen projection terminal, and then part or all of the content of the video played by the screen projection terminal can be switched. Therefore, the user can freely switch the content played by the screen projection terminal when using the screen projection terminal, the sharing of video play is realized, and the interactive scenario of delivery of multiple videos is expanded. Due to the display of the screen projection terminal for the selected image, the reverse projection of the image displayed by the display device onto the screen projection terminal can be realized. Besides, greater convenience is provided to the users, such that the users can view through the screen projection terminal when the display device is inconvenient to view.

Figure 8:
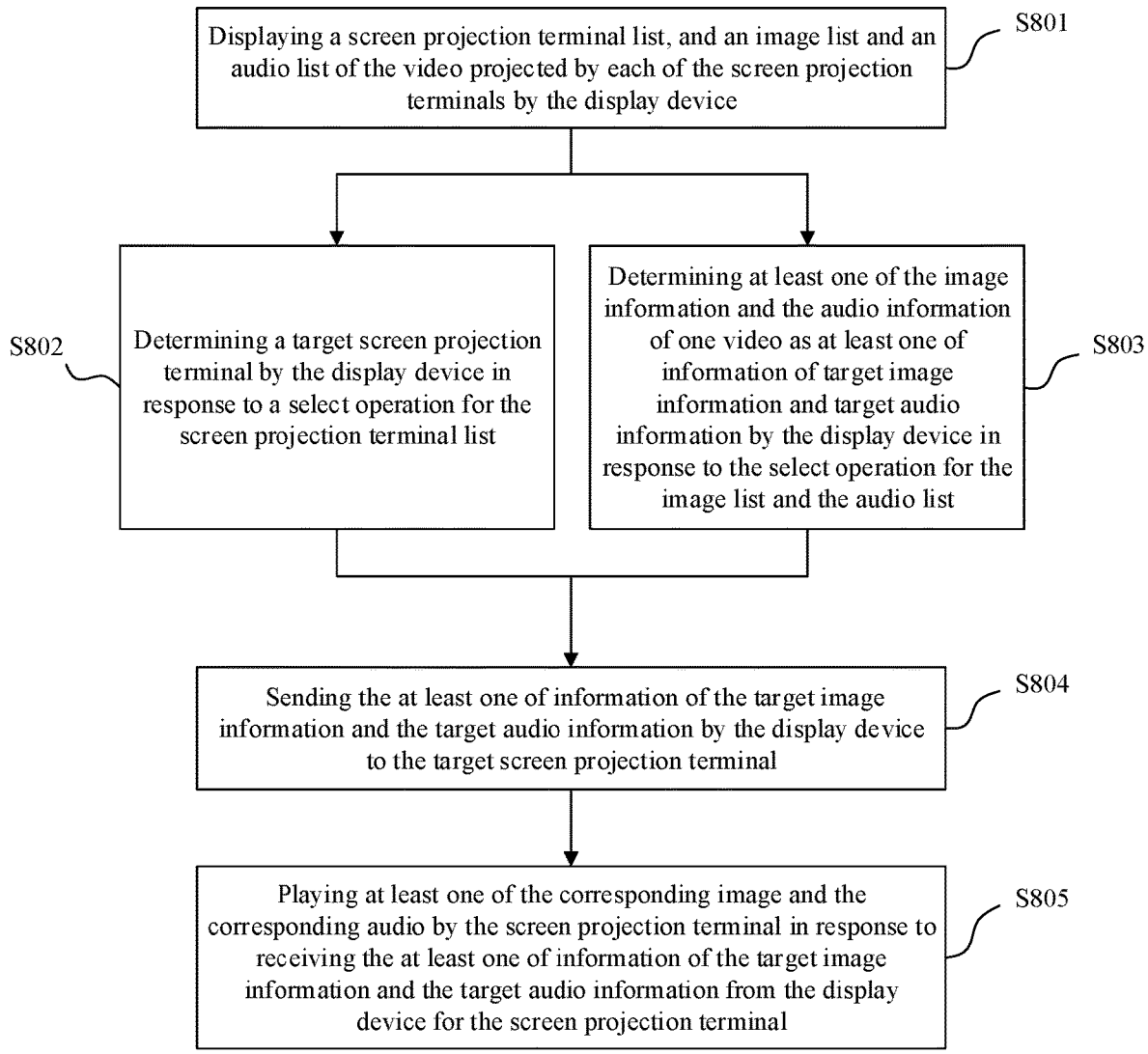
FIG. 8 is a schematic partial flowchart of one additional method for projecting a screen according to an embodiment of the present disclosure.

In an optional embodiment, as shown in FIG. 8, the method for projecting a screen according to the embodiment of the present disclosure may further include the following processes.

In S801, the display device displays a screen projection terminal list, and the image list and audio list of the video projected by each of the screen projection terminals, and then performs S802 and S803.

Figure 9:
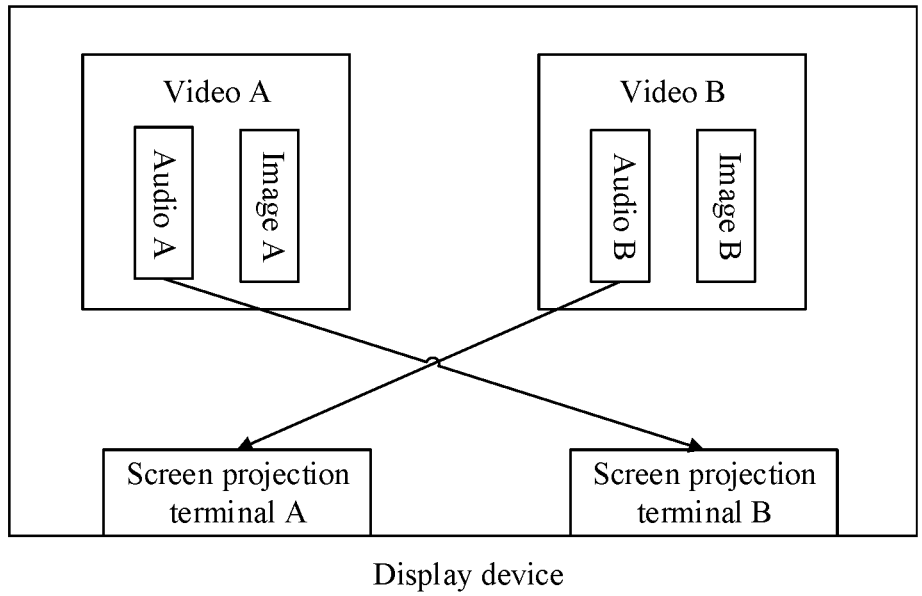
FIG. 9 is a schematic diagram of a display effect of displaying a screen projection terminal list and a video list on a display device according to an embodiment of the present disclosure.

The display effect of the display device for each list is as shown in FIG. 9. The screen projection terminal list in FIG. 9 shows the screen projection terminal A and the screen projection terminal B as examples. The image A and the image B in the image list are the image of the video projected by the screen projection terminal A and the image of the video projected by the screen projection terminal B respectively. The audio A and the audio B in the audio list are the audio of the video projected by the screen projection terminal A and the audio of the video projected by the screen projection terminal B respectively.

In S802, the display device determines a target screen projection terminal in response to a select operation for the screen projection terminal list, and then performs S804.

The select operation for the screen projection terminal list may be a touch operation of the user for a certain screen projection terminal option in the screen projection terminal list displayed by the display device as shown in FIG. 9, for example, a click operation.

In S803, the display device determines the target information in response to a select operation for the image list and the audio list, and the target information includes at least one of the image information and the audio information of the target video.

Specifically, in the present disclosure, processes S802 and S803 are not subject to a strict sequence, and may be performed simultaneously or sequentially.

The select operation for the image list and the audio list may be a touch operation of the user for a certain image option in the image list and a certain audio option in the audio list which are displayed on the screen projection terminal as shown in FIG. 9, for example, a click operation.

In some embodiments, the select operation for the screen projection terminal list, the image list, and the audio list may also be a user operation of dragging the image option or the audio option toward a certain screen projection terminal option. Through the dragging operation, the selection for the target screen projection terminal, the image information, and the audio information can be completed at one time.

In the embodiment shown in FIG. 9, the user may drag the audio A option in the audio list to the option of the screen projection terminal B according to the arrow shown in FIG. 9, so as to complete a first selection for the target screen projection terminal and the target audio information. The audio B option in the audio list may be dragged to the option of the screen projection terminal A according to the arrow shown in FIG. 9 to complete a second selection for the target screen projection terminal and target audio information.

In S804, the display device sends the target information to the target screen projection terminal.

In the embodiment shown in FIG. 9, the display device sends the audio information of the audio B to the screen projection terminal A, and sends the audio information of the audio A to the screen projection terminal B.

In S805, the screen projection terminal plays at least one of the corresponding image and the corresponding audio in response to receiving the target information from the display device for the screen projection terminal.

In this embodiment, the image information of the target video is the image information of one video determined by the display device in response to the select operation for the image list of the video projected by each of the screen projection terminals. The audio information of the target video is the audio information of one video determined by the display device in response to the select operation for the audio list of the video projected by each of the screen projection terminals.

In the embodiment shown in FIG. 9, in response to receiving the audio information of audio B, the screen projection terminal A may play the audio B, and in response to receiving the audio information of the audio A, the screen projection terminal B may play the audio A.

In this way, the selection for the image and audio of each video can be completed on the screen projection terminal, and then part or all of the content of the video played by the screen projection terminal can be switched. Therefore, the user can freely switch the content played by the screen projection terminal when using the screen projection terminal, the sharing of video play is realized, and the interactive scenario of delivery of multiple videos is expanded. Due to the display of the screen projection terminal for the selected image, the reverse projection of the image displayed by the display device onto the screen projection terminal can be realized. Besides, greater convenience is provided to the users, such that the users can view through the screen projection terminal when the display device is inconvenient to view.

Figure 10:
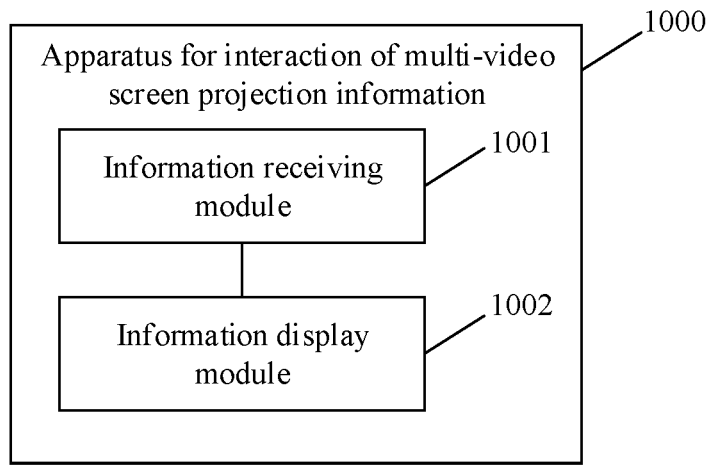
FIG. 10 is a schematic structural diagram of an apparatus for projecting a screen applicable to a display device according to an embodiment of the present disclosure.

Based on the same inventive concept, an apparatus for projecting a screen according to the embodiment of the present disclosure is applicable to a display device. As shown in FIG. 10, the apparatus 1000 includes: an information receiving module 1001 and an information display module 1002.

The information receiving module 1001 is configured to receive video screen projection information of a plurality of screen projection terminals.

The information display module 1002 is configured to display the image of a video projected by each of the screen projection terminals based on the video screen projection information, and play an audio of the video projected by at most one screen projection terminal while displaying the image; and feed play state information of the audio of the projected video back to the plurality of screen projection terminals, wherein the screen projection terminal to enters a corresponding audio play mode in response to receiving the play state information.

In some embodiments, the information display module 1002 is configured to play the audio of the video projected by the screen projection terminal corresponding to a first received audio play request; and enter a silent mode.

In some embodiments, the information receiving module 1001 is further configured to receive first feedback information from a first screen projection terminal for an audio switch request of a second screen projection terminal, wherein the first feedback information indicates approval of switching.

In some embodiments, in addition to the information receiving module 1001 and the information display module 1002, the apparatus 1000 according to the embodiment of the present disclosure further includes: an audio switching module. The audio switching module is configured to switch the currently played audio to the audio of the video projected by the second screen projection terminal in response to receiving the first feedback information, such that the second screen projection terminal is switched to a first audio play mode.

In some embodiments, the audio switching module is further configured to stop playing the audio of the video projected by the first screen projection terminal in response to receiving exit information from the first screen projection terminal; and play the audio of the video projected by the second screen projection terminal sending the audio play instruction in response to receiving an audio play instruction from the second screen projection terminal by the display device in a current non-audio play state.

In an optional embodiment, in addition to the information receiving module 1001 and the information display module 1002, the apparatus 1000 according to the embodiment of the present disclosure further includes: an information sending module.

The information sending module is configured to send video indication information of the video projected by each of the screen projection terminals to at least one screen projection terminal, wherein the video indication information includes image indication information and audio indication information. The information receiving module 1001 is further configured to receive selection information from at least one screen projection terminal, wherein the selection information is sent by the corresponding screen projection terminal for the select operation of a displayed image list and a displayed audio list, the image list and the audio list are acquired based on the multimedia indication information, the selection information indicates target information, wherein the target information includes at least one of image information and audio information of a target video. The information sending module is also configured to send the target information to the corresponding screen projection terminal in response to receiving the selection information.

In another optional embodiment, in addition to the information receiving module 1001 and the information display module 1002, the apparatus 1000 according to the embodiment of the present disclosure further includes: an information determining module and the information sending module.

The information display module 1002 is also configured to display a screen projection terminal list, as well as the image list and the audio list of the video projected by each of the screen projection terminals. The information determining module is configured to determine a target screen projection terminal in response to a select operation for the screen projection terminal list; and determine target information in response to the select operation for the image list and the audio list, wherein the target information includes at least one of the image information and the audio information of the target video. The information sending module is configured to send the target information to each target screen projection terminal.

Figure 11:
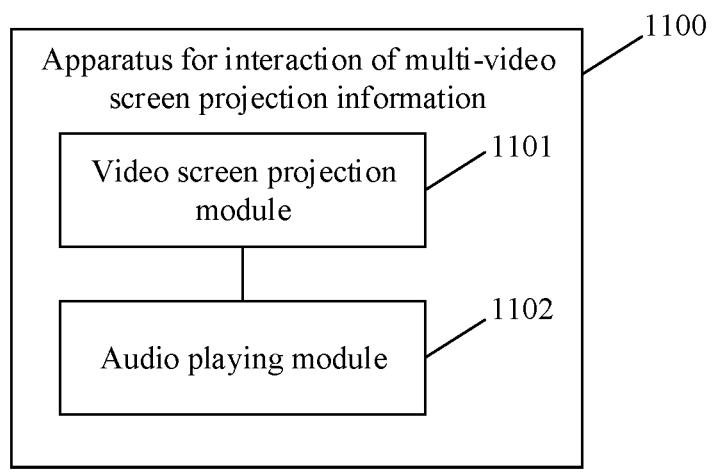
FIG. 11 is a schematic structural diagram of an apparatus for projecting a screen applied to a screen projection terminal according to an embodiment of the present disclosure.

An embodiment of the present disclosure also provides an apparatus for projecting a screen, which is applied to a screen projection terminal. As shown in FIG. 11, the apparatus 1100 includes: a video screen projection module 1101 and an audio playing module 1102.

The video screen projection module 1101 is configured to send video screen projection information to a display device. The audio playing module 1102 is configured to, in response to receiving the play state information of the audio of a video projected by the screen projection terminal from the display device, enter an audio play mode corresponding to the play state information.

In some embodiments, the audio playing module 1102 is configured to enter a first audio play mode in response to receiving multimedia-played information of the audio of the video projected by the screen projection terminal from the display device, wherein the first audio play mode is a mode in which the audio of the video projected by the screen projection terminal is played by the display device. Alternatively, the audio playing module 1102 is configured to, enter a second audio play mode in response to receiving multimedia-unplayed information of the audio of the video projected by the screen projection terminal from the display device, wherein the second audio play mode is a mode in which the audio of the video projected by the screen projection terminal is played by the screen projection terminal.

In an optional embodiment, in addition to the video screen projection module 1101 and the audio playing module 1102, the apparatus 1100 according to the embodiment of the present disclosure further includes: a first information receiving module and a first information sending module.

When the screen projection terminal is a first screen projection terminal, the first information receiving module is configured to receive an audio switch request from a second screen projection terminal. The first information sending module is configured to send first feedback information for the audio switch request to the display device and the second screen projection terminal, wherein the first feedback information indicates approval of switching. Therefore, the display device switches the currently played audio to the audio of the video projected by the second screen projection terminal in response to the feedback information being approval of switching. Besides, the second screen projection terminal is switched from the current second audio play mode to the first audio play mode in response to the feedback information being approval of switching. The audio playing module 1102 is configured to switch the first audio play mode of the first screen projection terminal to the second audio play mode.

In some embodiments, the first information receiving module may also be configured to receive a play stop instruction. The first information sending module may also be configured to send exit information to the display device and the second screen projection terminal respectively in response to receiving the play stop instruction, such that the display device stops playing the audio of the video projected by the first screen projection terminal, and the second screen projection terminal sends an audio play instruction to the display device in response to receiving a switch instruction.

In another optional embodiment, in addition to the video screen projection module 1101 and the audio playing module 1102, the apparatus 1100 according to the embodiment of the present disclosure further includes: a second information receiving module and a second information sending module.

The second information sending module is configured to: when the screen projection terminal is the second screen projection terminal, send the audio switch request to the first screen projection terminal in response to receiving the switch instruction. The second information receiving module is configured to receive the first feedback information from the first screen projection terminal for the audio switch request, wherein the first feedback information indicates approval of switching. The audio playing module 1102 is further configured to switch the current second audio play mode of the second screen projection terminal to the first audio play mode in response to receiving the first feedback information.

In some embodiments, the second information receiving module may also be configured to receive the exit information from the first screen projection terminal. The audio playing module 1102 may also be configured to, upon receipt of exit play information or exit screen projection information from the first screen projection terminal, send the audio play instruction to the display device in response to receiving the switch instruction, such that the display device plays the audio of the video projected by the second screen projection terminal.

In an optional embodiment, the second information receiving module may also be configured to receive video indication information of the video projected by each of the screen projection terminals from the display device, the video indication information including image indication information and audio indication information; and display an image list and an audio list based on the video indication information. The second information sending module may be further configured to send selection information to the display device in response to a select operation for the image list and the audio list, wherein the selection information indicates target information, and the target information includes at least one of image information and audio information of a target video.

The audio playing module 1102 may also be configured to, display at least one of a corresponding image and a corresponding audio in response to receiving the target information from the display device.

In another optional embodiment, the second information receiving module may also be configured to receive the target information from the display device, wherein the target information includes at least one of the image information and the audio information of the target video. The audio playing module 1102 may also be configured to play at least one of the corresponding image and the corresponding audio of the target information.

In the embodiments, the image information of the target video is the image information of one video determined by the display device in response to the select operation for the image list of the video projected by each of the screen projection terminals. The audio information of the target video is the audio information of one video determined by the display device in response to the select operation for the audio list of the video projected by each of the screen projection terminals.

The apparatus for projecting a screen according to the embodiment of the present disclosure is capable of performing the method applicable to the display device or the method applicable to the screen projection terminal according to the embodiment of the present disclosure, and the practice is similar. For the content which is not shown in detail in the present embodiment, reference may be made to the method embodiment described above, which is not repeated herein.

An embodiment of the present disclosure also provides a display apparatus and a screen projection terminal. Both the display device and the screen projection terminal include a memory and a processor, wherein the memory is communicably connected to the processor.

The memory in the display device stores a computer program. The processor in the display device, when running the computer program, is caused to perform any method for projecting a screen, which is applicable to the display device, according to the embodiment of the present disclosure.

The memory in the screen projection terminal stores a computer program. The processor in the screen projection terminal, when running the computer program, is caused to perform any method for projecting a screen, which is applicable to the screen projection terminal (the first screen projection terminal or the second screen projection terminal), according to the embodiment of the present disclosure.

Those skilled in the art can understand that the display device and the screen projection terminal according to the embodiment of the present disclosure may be specially designed and manufactured for the required purpose, or may also include known devices in a general-purpose computer. These devices include computer programs stored therein. The computer programs are selectively activated or reconfigured. Such computer programs may be stored in a device (for example, the computer) readable medium or in any type of mediums suitable for storing electronic instructions and respectively coupled to a bus.

Figure 12:
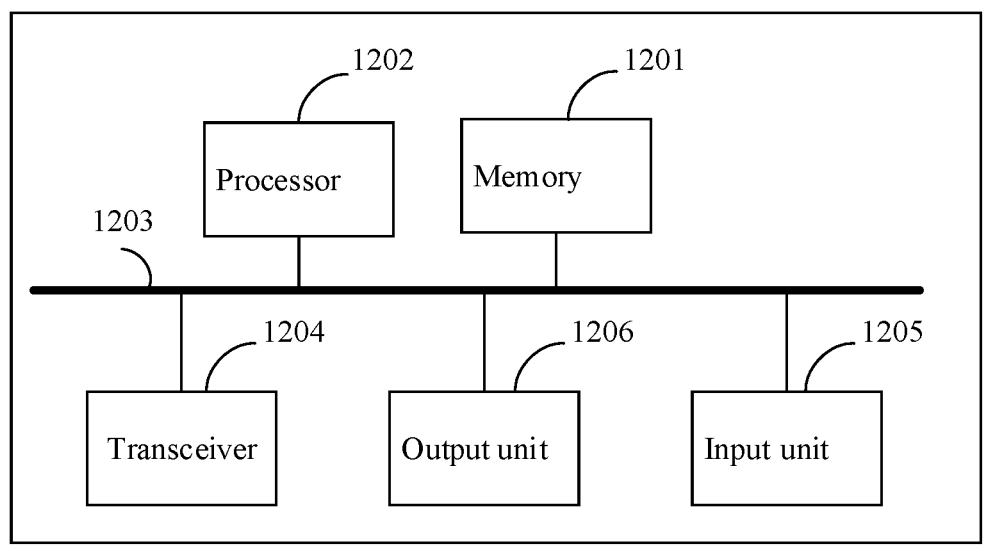
FIG. 12 is a schematic structural diagram of a display device and a screen projection terminal according to an embodiment of the present disclosure.

The present disclosure provides a display device and a screen projection terminal in an optional embodiment. As shown in FIG. 12, both the display device and the screen projection terminal include: a memory 1201 and a processor 1202. The memory 1201 and the processor 1202 are electrically connected, for example, connected through a bus 1203.

In some embodiments, the memory 1201 is configured to store application program codes of executing the solutions of the present disclosure, and the processor 1202 controls the execution. The processor 1202 is configured to run the application program codes stored in the memory 1201 to implement the method for projecting a screen according to the embodiment of the present disclosure.

The memory 1201 may be a read-only memory (ROM) or other types of static storage devices that can store static information and instructions, may be a random access memory (RAM) or other types of dynamic storage devices that can store information and instructions, may also be an electrically erasable programmable read-only memory (EEPROM), a compact disc read-only memory (CD-ROM) or other optical disc storage, optical disk storage (including compact disks, laser disks, optical disks, digital versatile disks, Blu-ray disks, etc.), and magnetic disc storage mediums or other magnetic storage devices, or and any other mediums that can be configured to carry or store desired program codes in the form of instructions or data structures and can be accessed by the computer, but not limited thereto.

The processor 1202 may be a central processing unit (CPU), a general-purpose processor, a data signal processor (DSP), an application specific integrated circuit (ASIC), a field-programmable gate array (FPGA) or other programmable logic devices, transistor logic devices, hardware components or any combination thereof. It can implement or execute various exemplary logical blocks, modules and circuits described in conjunction with the content of the present disclosure. The processor 1202 may also be a combination that implements computing functions, for example, including a combination of one or more microprocessors, a combination of the DSP and the microprocessor, and so on.

The bus 1203 may include a path for transferring information between the above components. The bus may be a peripheral component interconnect (PCI) bus or an extended industry standard architecture (EISA) bus. The bus may be divided into an address bus, a data bus, a control bus, and the like. For ease of description, only one thick line is illustrated in FIG. 12, which does not mean that only one bus or one type of bus is provided.

In some embodiments, the display device and the screen projection terminal may further include a transceiver 1204.

The transceiver 1204 may be configured for signal reception and transmission. The transceiver 1204 may allow the display device and the screen projection terminal to perform wireless or wired communication with other devices to exchange data. It should be noted that in practice, the number of transceivers 1204 is not limited to one.

In some embodiments, the display device and the screen projection terminal may further include an input unit 1205. The input unit 1205 may be configured to receive input numbers, characters, images, and/or sound information, or generate key signal inputs related to user settings and function control of an electronic device 1200. The input unit 1205 may include, but not limited to, one or more of a touch screen, a physical keyboard, a function key (such as a volume control button and a switch button), a trackball, a mouse, a joystick, a camera, a sound pickup, or the like.

In some embodiments, the display device and the screen projection terminal according to the embodiment of the present disclosure may further include an output unit 1206. The output unit 1206 may be configured to output or display the information processed by the processor 1202. The output unit 1206 may include, but not limited to, one or more of a display device, a speaker, a vibration apparatus, and the like.

Although FIG. 12 shows the display device and screen projection terminal with various apparatuses, it should be understood that not all of the illustrated apparatuses are required to be implemented or possessed. More or fewer apparatuses may be alternatively implemented or possessed.

An embodiment of the present disclosure also provides a non-transitory computer-readable storage medium. The non-transitory computer-readable storage medium stores a computer program thereon. The computer program, when run by a processor, causes the processor to perform any method for projecting a screen according to the embodiments of the present disclosure.

The non-transitory computer-readable medium includes, but not limited to, any type of discs (including a floppy disc, a hard disc, an optical disc, the CD-ROM, and a magneto-optical disc), the ROM, the RAM, an erasable programmable read-only memory (EPROM)), the EEPROM, a flash memory, a magnetic card, or a light card. That is, the readable medium includes any medium that stores or transmits information in a readable form by a device (for example, a computer).

An embodiment of the present disclosure also provides a non-transitory computer-readable storage medium, which is applicable to any of the above methods, and is not repeated here.

It can be understood by those skilled in the art that processes, measures and solutions in various operations, methods and processes discussed in the present disclosure may be alternated, modified, combined, or deleted. Further, other processes, measures, and solutions, with the various operations, methods and processes discussed in the present disclosure, may also be alternated, modified, rearranged, resolved, combined, or deleted. Further, processes, measures, and solutions in the prior art, with the various operations, methods and processes discussed in the present disclosure, may also be alternated, modified, rearranged, resolved, combined, or deleted.

In the descriptions of the present disclosure, it is to be understood that the terms "first" and "second" are only for the purpose of description and should not be construed as indicating or implying relative importance or implicitly indicating the number of technical features indicated. Thus, the features defined by the terms "first" and "second" may include one or more of the features either explicitly or implicitly. In the descriptions of the present disclosure, unless otherwise stated, the term "plurality" means two or more.

It should be understood that although the various processes in the flowcharts of the drawings are displayed in sequence as indicated by the arrows, these processes are not necessarily performed in sequence in the order indicated by the arrows. Unless explicitly stated in the disclosure, these processes are not subject to a strict sequence, and may be performed in other sequences. Moreover, at least part of the processes in the flowcharts of the drawings may include multiple sub-processes or multiple stages. These sub-processes or stages are not necessarily performed at the same time, but can be performed at different times, and these processes are not necessarily performed sequentially, but may be performed in turn or alternately with at least part of other processes or the sub-processes or stages of other processes.

The above descriptions merely represent part of embodiments of the present disclosure. It should be noted that those skilled in the art can make some improvements and modifications without departing from the principle of the present disclosure, and the improvements and modifications shall be included into the protection scope of the present disclosure.

What is claimed is:

1. A method for projecting a screen, applicable to a display device, the method comprising:
   receiving multimedia screen projection information of a plurality of screen projection terminals, wherein multimedia comprises an image and an audio;
   displaying images of multimedia projected by the plurality of screen projection terminals based on the multimedia screen projection information, and playing the audio of the multimedia projected by at most one of the plurality of screen projection terminals while displaying the images; and
   feeding play state information of the audio of the projected multimedia back to the plurality of screen projection terminals, wherein a different screen projection terminal enters a different audio play mode in response to receiving the play state information; and
   further comprising:
   sending multimedia indication information of the multimedia projected by each of the screen projection terminals to at least one of the plurality of screen projection terminals, wherein the multimedia indication information comprises image indication information and audio indication information;
   receiving selection information from the at least one screen projection terminal, wherein the selection information is sent by a corresponding screen projection terminal for a select operation of a displayed image list and a displayed audio list, the image list and the audio list are acquired based on the multimedia indication information, and the selection information indicates target information, the target information comprising at least one of image information and audio information of target multimedia; and
   sending the target information to the corresponding screen projection terminal in response to receiving the selection information.

2. The method according to claim 1, wherein playing the audio of the multimedia projected by at most one of the plurality of screen projection terminals while displaying the images comprises:

playing the audio of the multimedia projected by the screen projection terminal corresponding to a first received audio play request; or entering a silent mode.

3. The method according to claim 1, wherein the play state information comprises at least one of multimedia-played information and multimedia-unplayed information, the corresponding screen projection terminal enters a first audio play mode in response to receiving the multimedia-played information, and the corresponding screen projection terminal enters a second audio play mode in response to receiving the multimedia-unplayed information;

wherein the first audio play mode is a mode in which the audio of the multimedia projected by the screen projection terminal is played by the display device; and the second audio play mode is a mode in which the audio of the multimedia projected by the screen projection terminal is played by the screen projection terminal.

4. The method according to claim 3, further comprising:

receiving first feedback information from a first screen projection terminal for an audio switch request of a second screen projection terminal; wherein the first screen projection terminal is a screen projection terminal in the first audio play mode in the plurality of screen projection terminals, the second screen projection terminal is a screen projection terminal in the second audio play mode in the plurality of screen projection terminals, and the first feedback information indicates approval of switching; and in response to receiving the first feedback information, switching the currently played audio to the audio of the multimedia projected by the second screen projection terminal, and controlling the second screen projection terminal to be switched to the first audio play mode.

5. The method according to claim 3, further comprising:

stopping playing the audio of the multimedia projected by a first screen projection terminal in response to receiving exit information from the first screen projection terminal; and playing the audio of the multimedia projected by a second screen projection terminal in response to receiving an audio play instruction from the second screen projection terminal by the display device in a non-audio play state;

wherein the first screen projection terminal is a screen projection terminal in the first audio play mode in the plurality of screen projection terminals, and the second screen projection terminal is a screen projection terminal in the second audio play mode in the plurality of screen projection terminals.

6. The method according to claim 1, further comprising:

displaying a screen projection terminal list, and an image list and an audio list of the multimedia projected by each of the screen projection terminals;

determining a target screen projection terminal in response to a select operation for the screen projection terminal list;

determining target information in response to a select operation for the image list and the audio list, wherein the target information comprises at least one of image information and audio information of the target multimedia; and sending the target information to the target screen projection terminal.

7. The method according to claim 1, wherein the multimedia is a video.

8. A display device, comprising:

a memory storing a computer program; and a processor communicably connected to the memory;

wherein the processor, when running the computer program, is caused to perform the method for projecting a screen according to claim 1.

9. A non-transitory computer-readable storage medium storing a computer program, wherein the computer program, when run by a processor, causes the processor to perform the method for projecting a screen as defined in claim 1.

10. A method for projecting a screen, applicable to a plurality of screen projection terminals, the method comprising:

sending multimedia screen projection information to a display device, wherein multimedia comprises an image and an audio; and in response to receiving play state information of the audio of multimedia projected by the plurality of screen projection terminals from the display device, a different screen projection terminal entering a different audio play mode corresponding to the play state information; and further comprising:

displaying an image list and an audio list based on multimedia indication information of multimedia projected by each of the screen projection terminals received from the display device, wherein the multimedia indication information comprises image indication information and audio indication information;

sending selection information to the display device in response to a select operation for the image list and the audio list, wherein the selection information indicates target information, the target information comprising at least one of image information and audio information of target multimedia; and displaying at least one of a corresponding image and a corresponding audio in response to receiving target information from the display device.

11. The method according to claim 10, wherein entering the audio play mode corresponding to the play state information comprises:

entering a first audio play mode in response to receiving multimedia-played information of the audio of the multimedia projected by the screen projection terminal from the display device, wherein the first audio play mode is a mode in which the audio of the multimedia projected by the screen projection terminal is played by the display device; or entering a second audio play mode in response to receiving multimedia-unplayed information of the audio of the multimedia projected by the screen projection terminal from the display device, wherein the second audio play mode is a mode in which the audio of the multimedia projected by the screen projection terminal is played by the screen projection terminal.

12. The method according to claim 11, wherein the screen projection terminal is a first screen projection terminal, the first screen projection terminal being a screen projection terminal currently active in the first audio play mode; and the method further comprises:

receiving an audio switch request from a second screen projection terminal, wherein the second screen projection terminal is a screen projection terminal currently active in the second audio play mode;

sending first feedback information for the audio switch request to the display device and the second screen projection terminal, wherein the first feedback information indicates approval of switching; and
switching the current first audio play mode of the first screen projection terminal to the second audio play mode.

13. The method according to claim 11, wherein
the screen projection terminal is a first screen projection terminal, the first screen projection terminal being a screen projection terminal currently active in the first audio play mode; and
the method further comprises:
sending exit information to the display device and a second screen projection terminal respectively in response to receiving a play stop instruction, such that the display device stops playing the audio of the multimedia projected by the first screen projection terminal, and the second screen projection terminal sends an audio play instruction to the display device in response to receiving a switch instruction;
wherein the second screen projection terminal is a screen projection terminal currently active in the second audio play mode.

14. The method according to claim 10, wherein
the screen projection terminal is a second screen projection terminal, the second screen projection terminal being a screen projection terminal currently active in a second audio play mode; and
the method further comprises:
sending an audio switch request to a first screen projection terminal in response to receiving a switch instruction, wherein the first screen projection terminal is a screen projection terminal currently active in a first audio play mode;
receiving first feedback information from the first screen projection terminal for the audio switch request, wherein the first feedback information indicates approval of switching; and
switching the current second audio play mode of the second screen projection terminal to the first audio play mode in response to receiving the first feedback information.

15. The method according to claim 10, wherein
the screen projection terminal is a second screen projection terminal, the second screen projection terminal being a screen projection terminal currently active in a second audio play mode; and
the method further comprises:
upon receipt of exit information from a first screen projection terminal, sending an audio play instruction to the display device in response to receiving a switch instruction;
wherein the audio play instruction is configured to instruct the display device to play the audio of the multimedia projected by the second screen projection terminal, and the first screen projection terminal is a screen projection terminal currently active in a first audio play mode.

16. The method according to claim 10, further comprising:
receiving target information from the display device for the screen projection terminal, wherein the target information comprises at least one of image information and audio information of target multimedia; and
playing at least one of a corresponding image and a corresponding audio of the target information;
wherein the image information of the target multimedia is image information determined by the display device in response to a select operation for an image list of multimedia projected by each of the screen projection terminals; and the audio information of the target multimedia is audio information determined by the display device in response to a select operation for an audio list of the multimedia projected by each of the screen projection terminals.

17. A screen projection terminal comprising:
a memory storing a computer program; and
a processor communicably connected to the memory;
wherein the processor, when running the computer program, is caused to perform the method for projecting a screen as defined in claim 10.

18. A non-transitory computer-readable storage medium storing a computer program, wherein the computer program, when running by a processor, causes the processor to perform the method for projecting a screen as defined in claim 10.

* * * * *